Oct. 9, 1934.   W. L. KAUFFMAN, 2D   1,976,231
WRINGER
Filed March 10, 1931

Walter L. Kauffman II
INVENTOR.

BY
ATTORNEYS.

Patented Oct. 9, 1934

1,976,231

UNITED STATES PATENT OFFICE 1,976,231

WRINGER

Walter L. Kauffman, 2d, Youngstown, Ohio, assignor to Lovell Manufacturing Company, Erie, Pa., a corporation of Pennsylvania Application March 10, 1931, Serial No. 521,432

16 Claims. (Cl. 68—32)

Quick-release devices for wringers have heretofore been made. The present invention is designed to improve the type of release device which is illustrated and described in the patent to Misner, Reissue #15,865, June 24, 1924. With such apparatus when the release is effected the releasing handle swings quite violently and further inasmuch as the locking shoulders must rest on a definite stop the release requires a considerable movement of the releasing lever. With the present invention, the swinging of the releasing lever is guarded so that there is little danger of injuring a party effecting the release and the release may be accomplished with a smaller, or quicker movement than where the release lever is used directly. Features and details of the invention will appear from the specification and claims.

A preferred embodiment of the invention is illustrated in the accompanying drawing as follows:—

Figure 1:
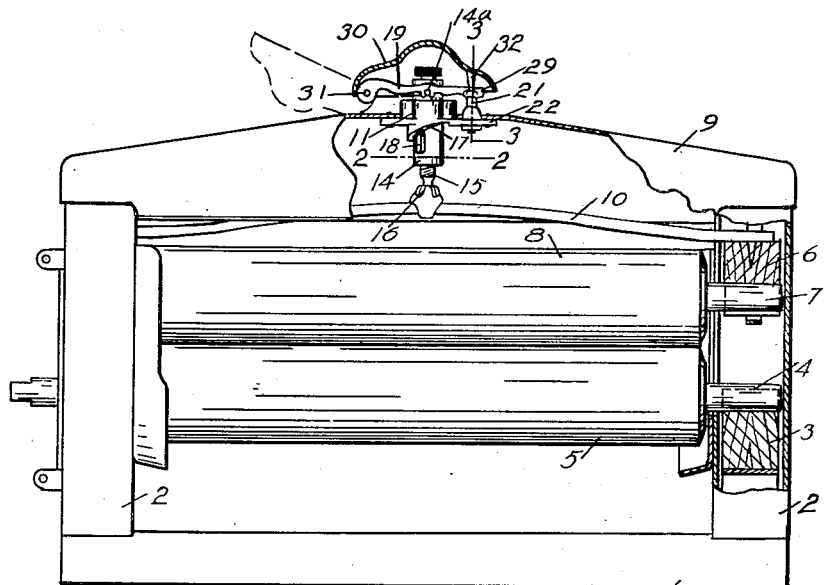

Fig. 1 shows a front elevation of the wringer, partly in section.

Figure 2:
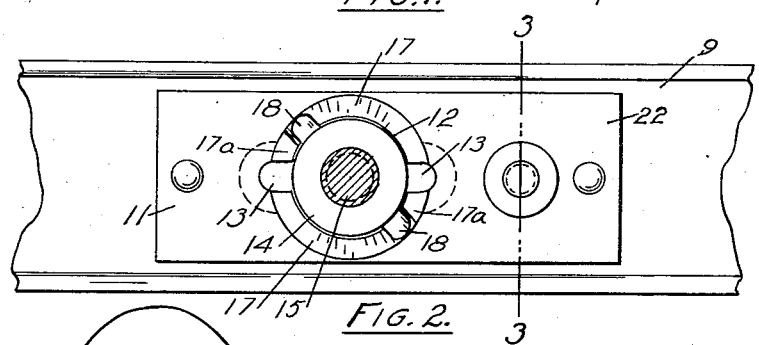

Fig. 2 a bottom view of the releasing mechanism, in section on the line 2—2 in Fig. 1.

Figures 3, 4:
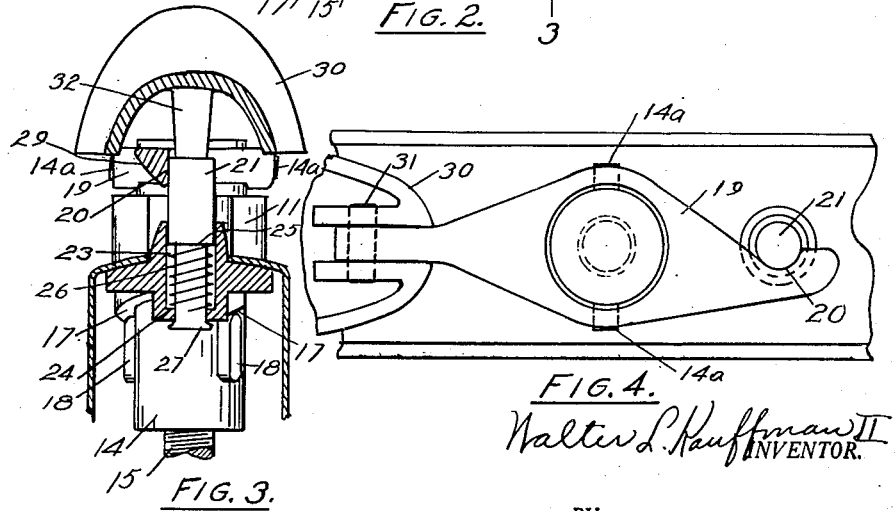

Fig. 3 a section on the line 3—3 in Fig. 1.

Fig. 4 an enlarged top view of the releasing mechanism, the actuating plate being swung back.

The frame is preferably formed of stamped metal having a channel-shaped base 1 and box-shaped stiles 2 secured to the base. Fixed bearings 3 are arranged in the stiles and a shaft 4 of the lower roll 5 operates in the bearings 3. Movable bearings 6 are also arranged in the stiles and a shaft 7 of the upper roll 8 is journaled in these bearings. Roll pressure means is supplied in the form of a spring 10 which rests upon the movable bearings 6. A release fitting 11 is secured to the top bar 9. It has an opening 12 with the projecting release slots 13. A release sleeve 14 extends through the opening 12 and an adjusting screw 15 extends through the sleeve 14. The screw has a ball socket connection 16 with the spring 10.

The usual release cams 17, such as are provided in the Misner structure, are arranged on the under-side of the fitting 11 and shoulders 18 on the sleeve 14 operate with relation to these cams. There is this difference however. In the Misner structure the shoulders are moved up the cams to a flat spot on the cams, whereas in the present structure with the wringer in operating position, the shoulders 18 are on the inclined portions of the cam tending to rotate the sleeve so as to swing the shoulders 18 into register with the release slots 13. The cams are provided with limiting stops 17a which prevent the shoulders from passing off the tops of the cams in the slots 13.

A release lever 19 is pivotally mounted on the upper end of the sleeve 14. Trunnions 14a are provided for this purpose. The lever has an engaging notch 20 which engages a locking pin 21. The locking pin is secured in an extension 22 on the fitting 11. The extension has a socket 23 and a shoulder 25 on the pin is arranged in this socket. A coil spring 26 is also arranged in the socket against the shoulder and is bottomed on a shoulder 24 at the bottom of the socket. The bottom end of the pin 21 is headed over at 27 forming a shoulder preventing the escape of the pin 21. The lever 19 has a cam surface 29 so that as the lever is swung to set position, this cam surface either forces the pin 21 downwardly, or the lever 19 upwardly so as to permit the lever to move past the pin when the return of the pin, or the downward movement of the lever brings it to set position, as clearly indicated in Fig. 3.

An actuating guard plate 30 is hinged at 31 on the lever 19. This guard plate is preferably oval shape at the top. The free end of this plate has a bar 32 which, when the lever is in its normal set position, rests on the top of the pin 21.

The locking lever 19 is released either by the downward movement of the free end of the guard plate 30 pushing the pin 21 downwardly so as to release the lever 19, or if pressure is placed on the guard plate at the hinge end of the guard plate, then the lever 19 is rocked raising the locking notch 20 to a position over the pin. In either case the lever 19 carrying the guard plate is released and the cam action of the shoulders 18 on the cams 17 rotates the releasing sleeve 14 so as to bring the shoulders 18 into register with the releasing slots 13 and effects the immediate release of the tension on the spring.

The actuating plate 30 is formed with a smooth oval top so that as the lever swings under the hand of the operator, there is no possibility of a blow being delivered to the hand of the operator. Thus a very quick and sensitive release is provided without any wide swinging part.

In setting the lever 19 the guard plate is swung back to the position shown in dotted lines in Fig. 1 and the position shown in Fig. 4 and this affords a long lever arm by means of which the release lever 19 may be readily swung to set position.

The cams in the present structure extend only in one direction. Consequently it is possible to make these cams longer and thus ease the setting action. It is preferable to terminate the high part of the cam with a stop 17a, as shown, to prevent the over-running of the shoulder 18. These long cams make it possible to set the device under ordinary conditions without a change of the adjusting screw 15. It is only necessary, therefore, to provide a knurled end 15a on the screw by means of which it may be readily adjusted by the operator when the guard plate is swung back.

What I claim as new is:—

1. In a wringer, the combination of a frame; rolls mounted in the frame; a pressure device for the rolls; a quick release for the pressure device including as members a pressure pin operating on the pressure device; a screw for adjusting the pressure of the pressure device; a sleeve on the frame in which the pin is mounted; a connection between the pin and sleeve comprising interlocking parts releasable through relative rotation of one of the members; an arm on the movable member; and a latch locking the arm in set position.

2. In a wringer, the combination of a frame; rolls mounted in the frame; a pressure device for the rolls; a quick release for the pressure device including as members a pressure pin operating on the pressure device; a screw for adjusting the pressure of the pressure device; a sleeve on the frame in which the pin is mounted; a connection between the pin and sleeve comprising interlocking parts releasable through relative rotation of one of the members; an arm on the movable member; a latch locking the arm in set position; and means energized by the pressure device tending to rotate the movable member when released by the latch to move the movable member into releasing position.

3. In a wringer, the combination of a frame; rolls mounted in the frame; a pressure device for the rolls; a quick release for the pressure device including as members a pressure pin operating on the pressure device; a screw for adjusting the pressure of the pressure device; a sleeve on the frame in which the pin is mounted; a connection between the pin and sleeve comprising interlocking parts releasable through relative rotation of one of the members; an arm on the movable member; a latch locking the arm in set position; and means for actuating the latch.

4. In a wringer, the combination of a frame; rolls mounted in the frame; a pressure device for the rolls; a quick release for the pressure device including as members a pressure pin operating on the pressure device; a screw for adjusting the pressure of the pressure device; a sleeve on the frame in which the pin is mounted; a connection between the pin and sleeve comprising interlocking parts releasable through relative rotation of one of the members; an arm on the movable member; a latch locking the arm in set position; means energized by the pressure device tending to rotate the movable member when released by the latch to move the movable member into releasing position; and means for actuating the latch.

5. In a wringer, the combination of a frame; rolls mounted in the frame; a pressure device for the rolls; a quick release for the pressure device including as members a pressure pin operating on the pressure device; a sleeve on the frame in which the pin is mounted; a connection between the pin and sleeve comprising interlocking parts releasable through relative rotation of one of the members; an arm on the movable member; a releasable latch locking the arm in set position; and means for actuating the latch comprising a guard over the movable arm and movable thereon.

6. In a wringer, the combination of a frame; rolls mounted in the frame; a pressure device for the rolls; a quick release for the pressure device including as members a pressure pin operating on the pressure device; a sleeve on the frame in which the pin is mounted; a connection between the pin and sleeve comprising interlocking parts releasable through relative rotation of one of the members; an arm on the movable member; and a releasable latch locking the arm in set position having a guard hinged on the arm and movable thereon.

7. In a wringer, the combination of a frame; rolls mounted in the frame; a pressure device for the rolls; a quick release for the pressure device including as members a pressure pin operating on the pressure device; a sleeve on the frame in which the pin is mounted; a connection between the pin and sleeve comprising interlocking parts releasable through relative rotation of one of the members; an arm on the movable member; and a releasable latch locking the arm in set position having a guard hinged on the arm and adapted to extend the arm when swung from actuating position.

8. In a wringer, the combination of a frame; rolls mounted in the frame; a pressure device for the rolls; a quick release for the pressure device including as members a pressure pin operating on the pressure device; a sleeve on the frame in which the pin is mounted; a connection between the pin and sleeve comprising interlocking parts releasable through relative rotation of one of the members; an arm on the movable member; a releasable latch locking the arm in set position; means for actuating the latch comprising a guard over the movable arm and movable thereon; and means energized by the pressure device tending to rotate the arm.

9. In a wringer, the combination of a frame; rolls mounted in the frame; a pressure device for the rolls; a quick release for the pressure device including a fitting on the frame having an opening therethrough and releasing slots therein; a releasing pin arranged in the opening and having a setting and releasing shoulder thereon, said pin operating on the pressure device; cams on the fitting engaged by the shoulder; an arm actuating the pin; a spring latch locking the arm in set position; and a guard plate hinged on the arm and adapted to actuate the latch.

10. In a wringer, the combination of a frame; rolls mounted in the frame; a pressure device for the rolls; a quick release for the pressure device including as members a pressure pin operating on the pressure device; a sleeve on the frame in which the pin is mounted; a connection between the pin and sleeve comprising interlocking parts releasable through relative rotation of one of the members; a rocking arm on the movable member; and a latch engaging the arm, said arm being releasable through the rocking of the arm.

11. In a wringer, the combination of a frame; rolls mounted in the frame; a pressure device for the rolls; a quick release for the pressure device including as members a pressure pin operating on the pressure device; a sleeve on the frame in which the pin is mounted; a connection between the pin and sleeve comprising interlocking parts releasable through relative rotation of one of the members; a rocking arm on the movable member; a latch engaging the arm, said arm being releasable through the rocking of the arm; and means energized by the pressure device tending to rotate the movable member when released by the latch to move the movable member into releasing position.

12. In a wringer, the combination of a frame; rolls mounted in the frame; a pressure device for the rolls; a quick release for the pressure device including as members a pressure pin operating on the pressure device; a sleeve on the frame in which the pin is mounted; a connection between the pin and sleeve comprising interlocking parts releasable through relative rotation of one of the members; an arm on the movable member; and a latch engaging the arm, said arm being released by a movement of the latch.

13. In a wringer, the combination of a frame; rolls mounted in the frame; a pressure device for the rolls; a quick release for the pressure device including as members a pressure pin operating on the pressure device; a sleeve on the frame in which the pin is mounted; a connection between the pin and sleeve comprising interlocking parts releasable through relative rotation of one of the members; a rocking arm on the movable member; and a latch engaging the arm, said arm being releasable through the rocking of the arm, or the movement of the latch.

14. In a wringer, the combination of a frame; rolls mounted in the frame; a pressure device for the rolls; a quick release for the pressure device including as members a pressure pin operating on the pressure device; a sleeve on the frame in which the pin is mounted; a connection between the pin and sleeve comprising interlocking parts releasable through relative rotation of one of the members; a rocking arm on the movable member; a latch engaging the arm; and a guard over the rocking arm and movable thereon, said arm being releasable by a rocking of the arm, or a movement of the latch through the action of the guard on the arm.

15. In a wringer, the combination of a frame; rolls mounted in the frame; a pressure device for the rolls; a quick release for the pressure device including as members a pressure pin operating on the pressure device; a sleeve on the frame in which the pin is mounted; a connection between the pin and sleeve comprising interlocking parts releasable through relative rotation of one of the members; an arm on the movable member; and a latch locking the arm in set position having a guard hinged on the arm and adapted to extend the lever when swung from actuating position to increase its leverage in actuating the movable member.

16. In a wringer, the combination of a frame comprising a top bar; rolls mounted in the frame; a pressure means for the rolls; and a safety release device comprising pressure sustaining members having unstable engagement and releasing when free under pressure of the means, said members having rotative engagement through a spiral cam and having a continued release movement beyond the cam action, the rotative member having an arm and a releasable latch mechanism securing the arm.

WALTER L. KAUFFMAN, II.